UNITED STATES PATENT OFFICE.

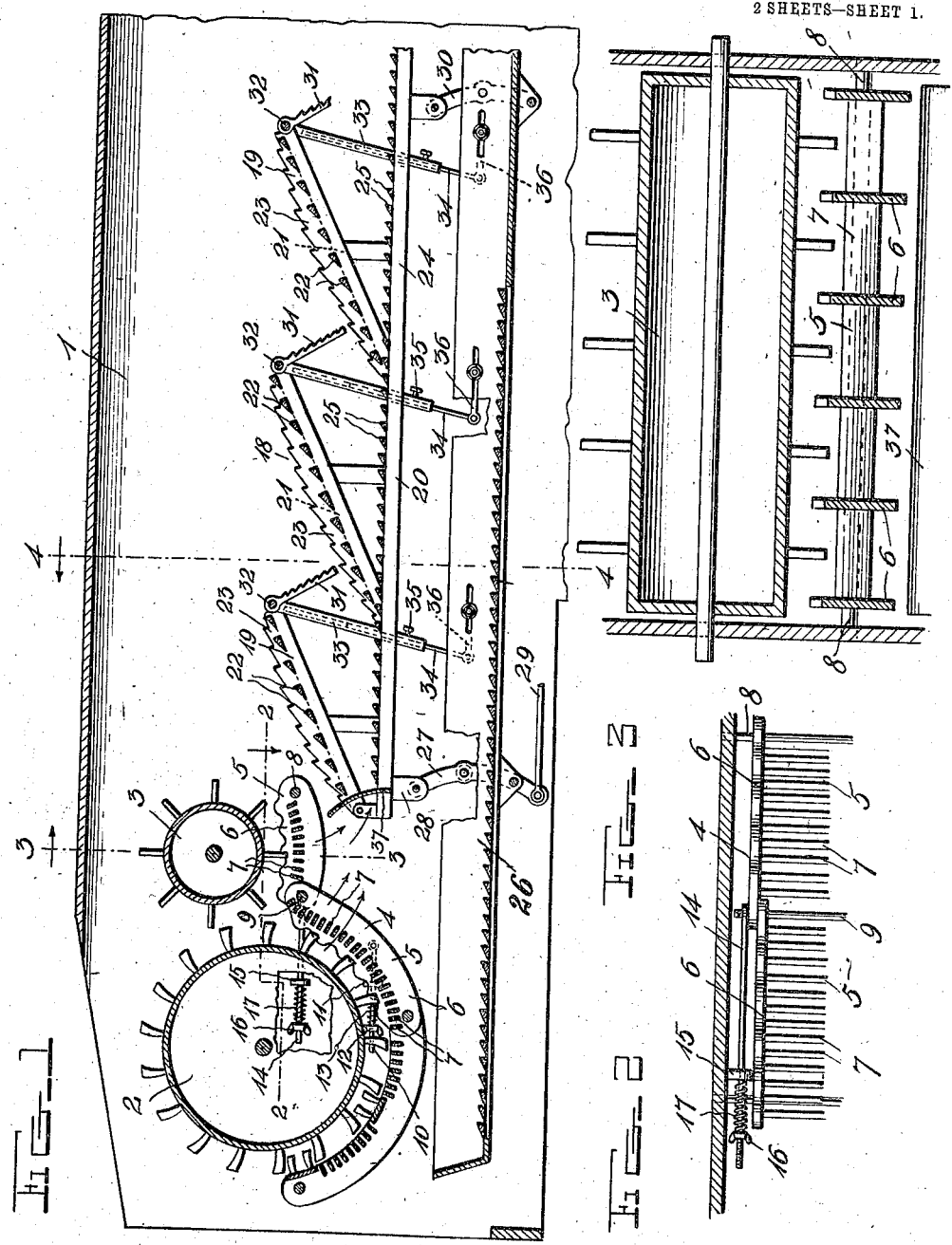

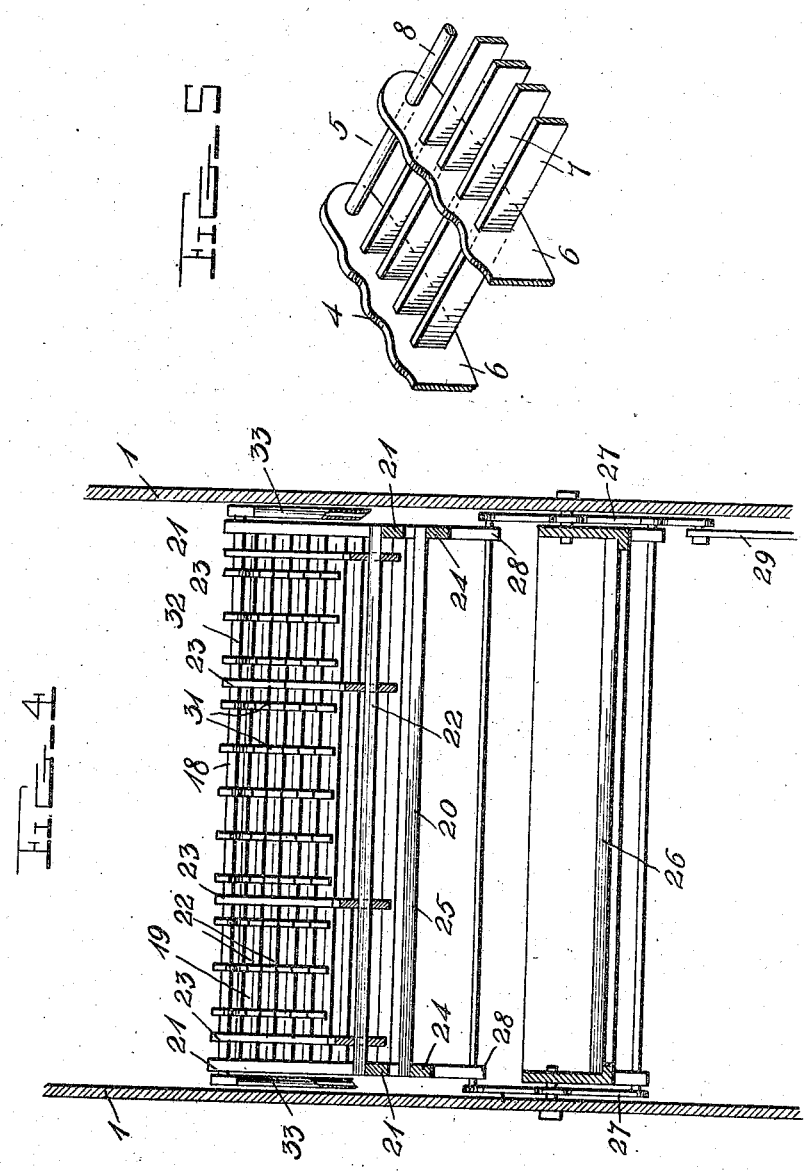

NED HUFF, OF JACKSON TOWNSHIP, WELLS COUNTY, INDIANA.

GRAIN-SEPARATOR.

No. 885,620.  Specification of Letters Patent.  Patented April 21, 1908.

Application filed August 8, 1907. Serial No. 387,654.

*To all whom it may concern:*

Be it known that I, NED HUFF, a citizen of the United States, residing at Jackson township, in the county of Wells and State of Indiana, have invented certain new and useful Improvements in Grain-Separators; and I do declare the following to be a full, clear, and exact description of the invention, such as will enable others skilled in the art to which it appertains to make and use the same.

My invention has relation to new and useful improvements in grain separators for separating grain from the straw and has for its object the production of a comparatively simple and efficiently operating device of this character by means of which grain may be separated from straw in an improved and expeditious manner without danger of the separating apparatus becoming deranged or inoperative.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a central longitudinal sectional view of a grain separator constructed in accordance with my invention; Fig. 2 is a horizontal sectional view on the line 2—2 of Fig. 1; Fig. 3 is a cross sectional view on the line 3—3 of Fig. 1 looking in the direction of the arrows; Fig. 4 is a similar view looking in the opposite direction; and Fig. 5 is a detail perspective view of the adjustable separating grate.

Referring now more particularly to the drawings, the numeral 1 represents the frame of the machine and 2 and 3 represent respectively a cylinder and drum beater journaled transversely in the front end of the frame.

The numeral 4 represents the adjustable separating grate which is composed of two independent separating members 5 comprising each a plurality of longitudinal parallel grate bars 6 through which pass a plurality of parallel grate bars 7 arranged at right angles therewith, the upper edges of said bars 6 extending a suitable distance above the grate bars 7 and are corrugated so as to coact with the teeth of the cylinder and drum in separating the grain from the straw. In the application of my invention, one of said separating members is arranged under the drum beater 3, is hinged at its outer end by a transverse rod 8 or other equivalent means to the side walls of the frame and is hingedly connected at its inner or opposite end to the upper end of the other separating member arranged in an oblique position to work under the cylinder by a transverse rod 9 or other equivalent means. The lower end of said last mentioned separating member is adjustably secured to the side pieces of the frame by supporting rods 10 secured at their inner ends to the lower end and at or near the sides of said member and working through horizontal guides 11 extending inwardly from the side pieces of the frame, the free ends of said supporting rods being threaded to receive thumb-nuts 12 and having arranged thereon between said nuts and said horizontal guides coiled springs 13. Rods 14 are connected at their inner ends to or near the ends of said transverse rod 9 work through suitable guides 15 extending inwardly from the side pieces of the frame are threaded at their free ends to receive thumb nuts 16 and have disposed thereon between said guides and thumb nuts coiled springs 17. By constructing said adjustable separating grate 4 and securing it in position in the frame in the manner I have shown and described, said grate will readily adjust itself to different volumes of straw passing between the cylinder, drum beater and the same and the danger of the grate becoming deranged or inoperative by any foreign object passing into the machine is reduced to a minimum.

The numeral 18 represents a separating rack arranged longitudinally in the frame, said rack comprising a plurality of corresponding upper rack members 19 arranged at a suitable angle and connected at their lower ends or cast with a lower horizontal rack member 20, each of said upper rack members 19 comprising side pieces 21 having arranged across them equal distances apart a plurality of transverse parallel slats 22 and a parallel series of toothed separating bars 23 secured to and arranged at right angles with said slats. The lower horizontal rack member is also provided with side pieces 24 having arranged across them a plurality of transverse parallel slats or bars 25 which are arranged somewhat closer together than the slats or bars of said upper rack bars 19.

The numeral 26 represents the grain pan which is arranged to work in and longitudinally of the frame and is connected to the front end of the lower horizontal rack member 20 by arms 27 loosely connected near their upper and lower ends to lugs 28 extending diagonally from the sides of said lower rack member 20 and grain pan 26, pivoted near their centers to a transverse rod journaled in the frame of the machine and connected at their lower ends to the connecting bars or members 29 extending from the frame below the grain pan. The rear end of the grain pan is connected to the sides of the lower rack member by links or bars 30.

31 represents a plurality of parallel lifting arms or fingers pivotally connected to the upper ends of each of said upper rack members 19 of the separating rack 18 by a transverse rod 32 journaled thereto. Rods 33 having sockets in their lower ends are secured near the ends of said transverse rods 32 and working in the sockets of said rods are extension rods 34 which are adjustably held in position by set screws 35 or other equivalent means. The lower end of said extension rods are connected in any suitable manner to the inner ends of connecting rods 36 extending longitudinally of the grain pan and adjustably connected at their outer ends to the sides thereof in any suitable manner.

The numeral 37 represents a deflecting plate which is secured in any suitable manner near the front end of the separating rack 18 and is arranged transversely therewith, said plate serving to deflect the grain separated from the straw by means of said cylinder, drum beater and separating grate into the grain pan.

In the operation of my invention, straw is fed in the machine at its front end and passes between the cylinder, drum beater and adjustable separating grate which separate the grain from the straw which strikes against the deflecting plate and is deflected into the grain pan. Said adjustable separating grate will readily adjust itself to the volume of straw and liability of the same becoming broken or damaged by too large a volume of straw or by some foreign object is reduced to a minimum. The straw passes from the separating grate to the upper rack members 19 of the separating rack 18 which quickly carry off the long straw, the short straw and chaff falling through the rack members and lifting arms or fingers 31 to the lower rack member 20. When the separating rack 18 is moving toward the cylinder and separating grate, the grain pan is moving in the opposite direction and the free ends of the lifting arms or fingers are raising and serve to raise any long straw that has fallen between the rack members 19 to the rear of the machine. The desired amount of movement of the lifting fingers may be regulated by adjusting the extension rods 34 up or down and the relative angle between the free or upper ends of the upper rack members and lifting arms or fingers 19 and 31 respectively may be secured by adjusting the free or outer ends of the connecting rods 36 along the side of the grain pan.

Having thus described my invention, what I claim as new is:—

1. A grain separator of the character specified, embracing a frame, a toothed cylinder journaled in one end thereof, a toothed drum beater journaled in rear of the cylinder, a grate member section pivotally supported at its outer end under the drum beater, said section comprising a plurality of longitudinally and transversely disposed spaced grate bars, the outer edges of the former being corrugated and disposed in a plane above the latter and a second similar grate member section arranged under the cylinder, said last mentioned section being pivotally connected at its outer end with the frame and loosely connected at its inner end with the inner end of the first mentioned grate member section and yieldable supporting means for the connected ends of the grate member section and also for the second mentioned grate section.

2. A grain separator of the character specified embracing a reciprocatory separating rack comprising a lower horizontal rack member and a plurality of spaced inclined rack members, the latter being arranged on the former, an oppositely movable reciprocatory pan, suspended below the rack, a rock shaft journaled to the outer ends by each of the inclined rack members, a plurality of spaced lifting fingers fixed to each of the rock shafts and arranged to swing in a vertical plane over the adjacent inclined rack members, tubular members fixed to the ends of the rock shafts, extension rods adjustable in the tubular members, and adjustable connections between the lower ends of the extension rods and opposite sides of the grain pan.

3. A grain separator of the character specified, embracing a frame, a toothed cylinder journaled in one end thereof, a toothed drum beater journaled in rear of the cylinder, a grate member section pivotally supported at its outer end under the drum beater, said section comprising a plurality of longitudinally and transversely disposed spaced grate bars, the outer edges of the former being corrugated and disposed in a plane above the latter and being designed to coact with the drum beater teeth during the grain-separating operation, a second similar grate member section arranged under the cylinder, said last-mentioned section being pivotally connected at its outer end with the frame and loosely connected at its inner or opposite end to the first-mentioned grate member section, and the longitudinally corrugated grate bars of the second mentioned grate member section being designed to coact with the cylinder teeth during the grain-separating operation, and yieldable supporting means for the connected ends of the grate member sections.

In testimony whereof I have hereunto set my hand in presence of two subscribing witnesses.

NED HUFF.

Witnesses:
J. A. HAHN,
C. A. WESTFALL.